(12) United States Patent
Winborn (10) Patent No.: US 10,179,304 B2
(45) Date of Patent: Jan. 15, 2019

(54) TANK FITTING APPARATUS AND METHOD

(71) Applicant: Craig V. Winborn, Midland, TX (US)

(72) Inventor: Craig V. Winborn, Midland, TX (US)

( * ) Notice: Subject to any disclaimer, the term of this patent is extended or adjusted under 35 U.S.C. 154(b) by 0 days.

(21) Appl. No.: 15/606,750

(22) Filed: May 26, 2017

(65) Prior Publication Data

US 2018/0339249 A1  Nov. 29, 2018

(51) Int. Cl.
*B01D 35/157* (2006.01)
*B01D 35/153* (2006.01)
*C02F 1/00* (2006.01)
*B29C 65/00* (2006.01)

(52) U.S. Cl.
CPC ....... *B01D 35/1573* (2013.01); *B01D 35/153* (2013.01); *B29C 66/8167* (2013.01); *C02F 1/006* (2013.01); *B01D 35/157* (2013.01); *B29C 66/816* (2013.01); *Y10T 137/86308* (2015.04); *Y10T 137/86316* (2015.04)

(58) Field of Classification Search
CPC .............. B01D 35/1573; B01D 35/153; B29C 66/8167; C02F 1/006; Y10T 137/598; Y10T 137/86308; Y10T 137/137; Y10T 137/86316
See application file for complete search history.

(56) References Cited

U.S. PATENT DOCUMENTS

| | | | |
|---|---|---|---|
| 1,426,008 A * | 8/1922 | Posson | F16K 27/07 137/585 |
| 1,652,510 A * | 12/1927 | Allen | F16K 27/02 251/144 |
| 2,879,785 A * | 3/1959 | Vesterdal | B60P 3/246 105/360 |
| 4,492,392 A | 1/1985 | Woods et al. | |
| 5,135,133 A | 8/1992 | Frost | |
| 5,988,699 A | 11/1999 | Quandt | |
| 6,971,633 B2 | 12/2005 | Gillen | |
| 7,121,589 B2 | 10/2006 | Hawkinson et al. | |
| 7,712,790 B2 * | 5/2010 | Descutner | F16L 5/08 285/139.1 |
| 8,985,145 B2 * | 3/2015 | Oltman | F16K 15/188 137/533.11 |
| 9,322,489 B2 | 4/2016 | Lipinski | |

* cited by examiner

*Primary Examiner* — Craig Schneider
*Assistant Examiner* — Kevin Barss
(74) *Attorney, Agent, or Firm* — Patterson & Sheridan, LLP (57) ABSTRACT

A tank fitting apparatus and method is provided. The tank fitting apparatus includes a bottom plate apparatus. The bottom plate apparatus includes a bottom plate having a bottom surface, a top surface, and a bottom plate passageway. The bottom plate apparatus further includes a bolt connected to the bottom plate and extending from the top surface of the bottom plate. The tank fitting apparatus further includes a valve apparatus. The valve apparatus includes a pipe and a valve integrally formed with the pipe. The valve is movable between an open valve position and a closed valve position. A top plate integrally formed on the pipe and extends outwardly from the pipe. The valve apparatus has a connected tank fitting position where the bolt of the bottom plate apparatus extends through the top plate of the valve apparatus to connect the valve apparatus with the bottom plate apparatus.

19 Claims, 8 Drawing Sheets

TANK FITTING APPARATUS AND METHOD

BACKGROUND

Field

Embodiments described herein relate generally to the field of tank fittings, and in particular, to the field of tank fitting apparatuses and methods for plastic chemical tanks.

Description of the Related Art

Tank fittings have been used on chemical storage tanks to provide a fluid connection controlled by a valve apparatus. A tank fitting can be added to a storage tank that has a tank fitting opening in a side of the storage tank. The tank fitting may include a bottom plate with a pipe connected to the bottom plate. The pipe can then be connected to the storage tank by inserting the pipe through a tank fitting opening with the bottom plate in an interior region of the storage tank. An outlet pipe end of the pipe extends outwardly from the storage tank in an exterior region outside the storage tank. The pipe may be secured to the storage tank by placing a top plate with a pipe opening over the pipe and securing the top plate to the bottom plate with bolts. After the pipe has been secured to the storage tank, a valve may be threaded onto the outlet pipe end of the pipe to connect the valve onto the pipe at a valve pipe joint.

The design and installation of the tank fitting apparatus is important to minimize the risk of stored fluids leaking from the storage tank. There is a need for a tank fitting apparatus and method that provides for efficient installation and that reduces the potential of fluid leaks from the tank fitting apparatus.

SUMMARY

Embodiments of the disclosure describe a tank fitting apparatus and method. The tank fitting apparatus for a storage tank includes a bottom plate apparatus. The bottom plate apparatus includes a bottom plate having a top surface, a bottom surface, and a bottom plate passageway. The bottom plate apparatus further includes a plurality of bolts connected to the bottom plate and extending from the top surface of the bottom plate, and a bottom plate installation connector disposed proximate the bottom plate passageway. The tank fitting apparatus further includes an installation handle tool. The installation handle tool is detachably attachable to the bottom plate apparatus by the bottom plate installation connector. The bottom plate apparatus has a deployment position where the installation handle tool is attached to the bottom plate apparatus and a non-deployment position where the installation handle tool is detached from the bottom plate apparatus. The tank fitting apparatus further includes a valve apparatus. The valve apparatus includes a pipe, a valve connected to the pipe and having a valve housing. The valve housing is integrally formed with the pipe, and the valve is movable between an open valve position and a closed valve position. The valve apparatus further includes a top plate integrally formed on the pipe and extending outwardly from the pipe and having a top plate bottom surface. The valve apparatus has a connected tank fitting position where the plurality of bolts of the bottom plate apparatus extend through the top plate of the valve apparatus to connect the valve apparatus with the bottom plate apparatus.

A method is provided for installing a tank fitting apparatus on a tank wall of a storage tank. The method includes attaching an installation handle tool onto a bottom plate apparatus to position the bottom plate apparatus in a deployment position. The bottom plate apparatus includes a bottom plate having a top surface, a bottom surface, a bottom plate passageway, and a plurality of bolts connected to the bottom plate and extending from a top surface of the bottom plate. The bottom plate apparatus is positioned through a tank opening to a tank interior in the storage tank while the bottom plate apparatus is in the deployment position. The installation handle tool is inserted from the tank interior, through a tank fitting opening in the tank wall, and to a tank exterior while the bottom plate apparatus is in the deployment position. The plurality of bolts of the bottom plate apparatus is inserted from the tank interior, through the tank wall, and to the tank exterior so that the bottom plate is positioned adjacent to an interior surface of the tank wall and the plurality of bolts extend from an exterior surface of the tank wall while the bottom plate apparatus is in the deployment position. The installation handle tool is detached from the bottom plate apparatus after inserting the plurality of bolts so as to position the bottom plate apparatus in a non-deployment position. A valve apparatus is positioned at the exterior of the storage tank proximate the tank fitting opening. The valve apparatus includes a pipe, a valve having a valve housing integrally connected to the pipe, and a top plate integrally connected to the pipe and extending outwardly from the pipe. The valve is movable between an open valve position and a closed valve position. The bolts extending from the exterior surface of the tank wall are inserted through the top plate when the bottom plate apparatus is in the non-deployment position. a plurality of bolt nuts are attached to the plurality of bolts to connect the bottom plate apparatus to the valve apparatus in a connected tank fitting position where the valve apparatus is installed on the storage tank.

A tank fitting apparatus includes a bottom plate apparatus. The bottom plate apparatus includes a bottom plate having a bottom surface, a top surface, and a bottom plate passageway. The bottom plate apparatus further includes a bolt connected to the bottom plate and extending from the top surface of the bottom plate. The tank fitting apparatus further includes a valve apparatus. The valve apparatus includes a pipe and a valve integrally formed with the pipe. The valve is movable between an open valve position and a closed valve position. A top plate integrally formed on the pipe and extends outwardly from the pipe. The valve apparatus has a connected tank fitting position where the bolt of the bottom plate apparatus extends through the top plate of the valve apparatus to connect the valve apparatus with the bottom plate apparatus.

BRIEF DESCRIPTION OF THE DRAWINGS

So that the manner in which the above recited features of the present disclosure can be understood in detail, a more particular description of the disclosure, briefly summarized above, may be had by reference to implementations, some of which are illustrated in the appended drawings. It is to be noted, however, that the appended drawings illustrate only selected implementations of this disclosure and are therefore not to be considered limiting of its scope, for the disclosure may admit to other equally effective implementations.

To facilitate understanding, identical reference numerals have been used, wherever possible, to designate identical elements that are common to the Figures. Additionally, elements of one implementation may be advantageously adapted for utilization in other implementations described herein.

DETAILED DESCRIPTION

Embodiments herein generally provide a tank fitting apparatus that includes a valve apparatus that is installed on a storage tank using a bottom plate apparatus. The tank fitting apparatus is designed to reduce leak points and to provide efficient installation of the tank fitting apparatus on the storage tank. The valve apparatus includes an elongated pipe, a valve, and a top plate that are integrally connected to provide a one piece design that reduces leak points. The valve apparatus has a connected tank fitting position where the valve apparatus is connected to the bottom plate apparatus to install the valve apparatus on a tank wall of the storage tank. The bottom plate apparatus is configured to be detachably attached to an installation handle tool to provide for efficient installation of the tank fitting apparatus on the storage tank.

Figure 1:
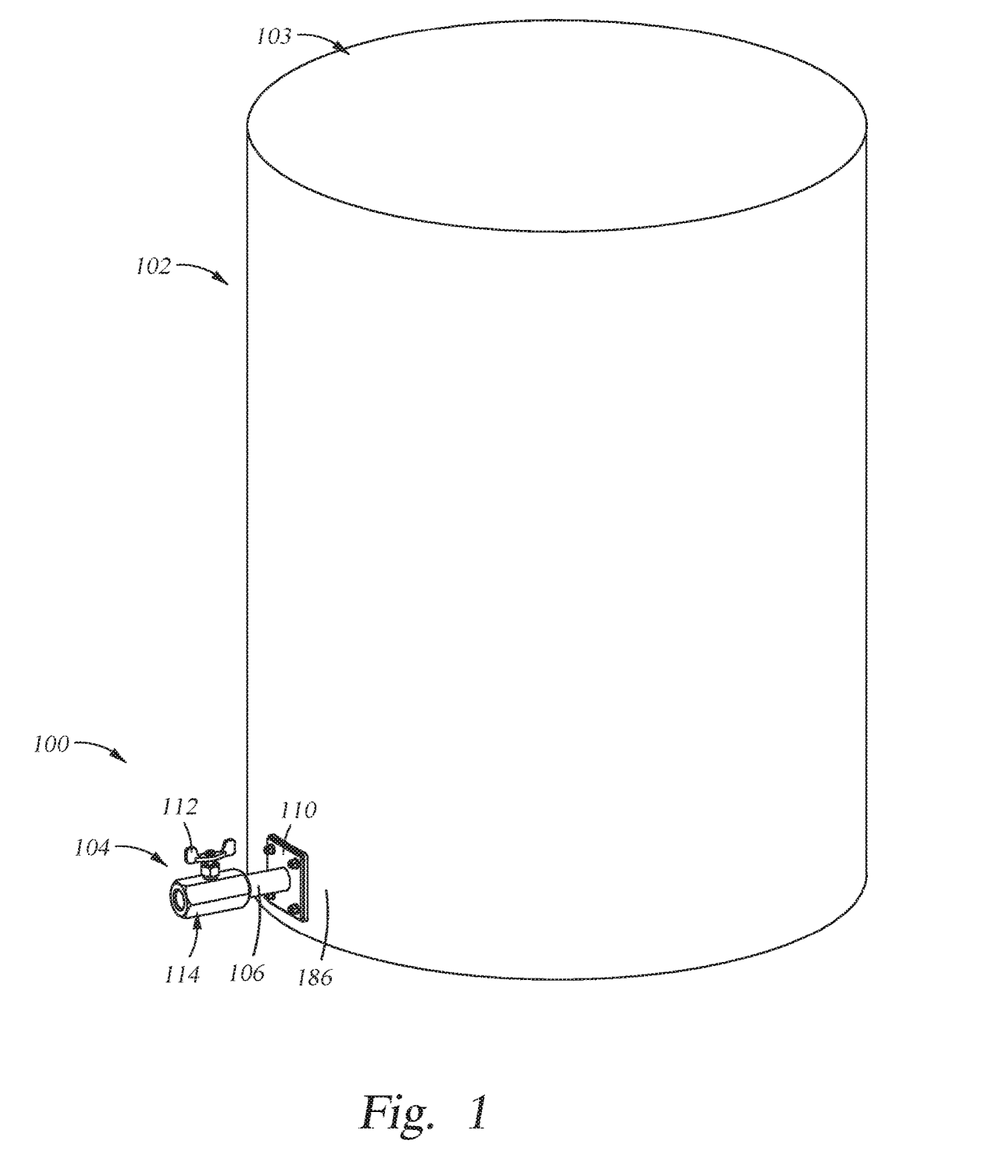
FIG. 1 is a perspective view of a tank fitting apparatus showing the tank fitting apparatus installed on a storage tank according to one embodiment.

FIG. 1 depicts a tank fitting apparatus 100 mounted on a tank wall 186 of a storage tank 102 having a tank opening 103. The tank fitting apparatus 100 includes a valve apparatus 104 disposed in an exterior region of the storage tank 102. The valve apparatus 104 includes a pipe 106, a top plate 110, and a valve 114. A valve handle 112 is connected to the valve 114 for positioning the valve apparatus 104 between an open valve position to allow fluid to drain from the storage tank 102 and a closed valve position to prevent fluid from flowing from the storage tank 102 through the valve apparatus 104.

Figure 2:
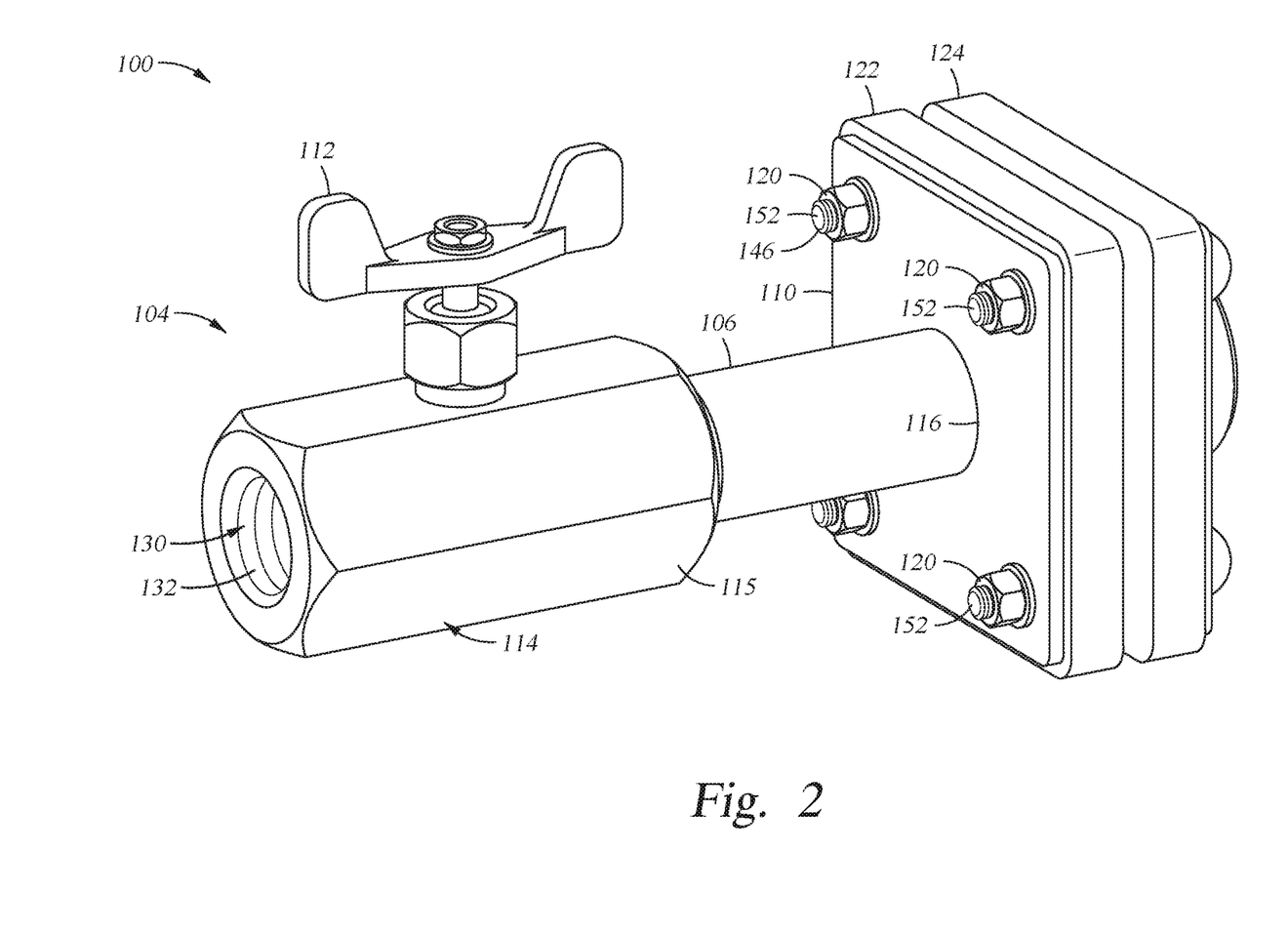
FIG. 2 is a perspective view of the tank fitting apparatus showing a valve apparatus according to one embodiment.

FIG. 2 is a perspective view of the tank fitting apparatus 100 showing the valve apparatus 104 according to one embodiment. The pipe 106 is an elongated tubular. The valve 114 includes a valve housing 115 that is integrally connected to the pipe 106 so that there is an integral connection between the valve 114 and the pipe 106. The top plate 110 is integrally formed at a pipe inlet section 116. Extending through the top plate 110 is a plurality of bolts 152. There are four bolts 152 shown in FIG. 2 with the bolts 152 located at the corner areas of the top plate 110. In other embodiments, a different number of bolts 152 may extend through the top plate 110, and may be located at different positions on the top plate 110.

The integral connection of the valve 114 to the pipe 106 and the integral connection of the top plate 110 and the pipe 106 eliminate the need for threaded connections between the pipe 106, the top plate 110, and the valve 114. The integral connections between the valve 114 and the pipe 106 may be formed during a manufacturing process where the pipe 106 and the valve 114 are formed from a single piece of metal. In other embodiments, integral connections between the valve 114 and the pipe 106 may be formed by welding. The pipe 106, top plate 110, and the valve housing 115 may be formed from stainless steel, other metals, or plastic.

The integral connections between the pipe 106 and the top plate 110 may be formed during a manufacturing process where the pipe 106 and the top plate 110 are formed from a single piece of metal. In other embodiments, integral connections between the pipe 106 and the top plate 110 may be formed by welding. In some embodiments, the integral connections between the valve 114, the pipe 106, and the top plate 110 may be formed during a manufacturing process where the valve 114, the pipe 106, and the top plate 110 are formed from a single piece of metal or other material. In other embodiments, integral connections between the valve 114, the pipe 106, and the top plate 110 may be formed by welding.

The integral connections between the pipe 106, the top plate 110, and the valve 114 help reduce leak points for the tank fitting apparatus 100. The integral connections between the valve 114, the pipe 106, and the top plate 110 do not include threaded connections. The integral connections are formed to reduce leak points that otherwise may be provided by threaded connections. The integral connections between the valve 114, the pipe 106, and the top plate 110 form a one-piece design of the valve apparatus 104 that reduces leak points for the valve apparatus 104.

The valve apparatus 104 includes a valve outlet opening 130 that has valve internal threads 132 for providing a valve outlet connection. The valve internal threads 132 may be used to connect to a drain line (not shown) to direct fluid from the storage tank 102 to another location. The top plate 110 has a rectangular or square shape and plate connectors in the form of a plurality of bolt nuts 120. As shown in FIG. 2, there are four bolt nuts 120. The bolt nuts 120 have bolt nut internal threads for connecting with the external threads 162 of the bolts 152. Washers 155 are disposed between the bolt nuts 120 and the top plate 110. Disposed below top plate 110 are a top seal member 122 and a bottom seal member 124.

Figure 3:
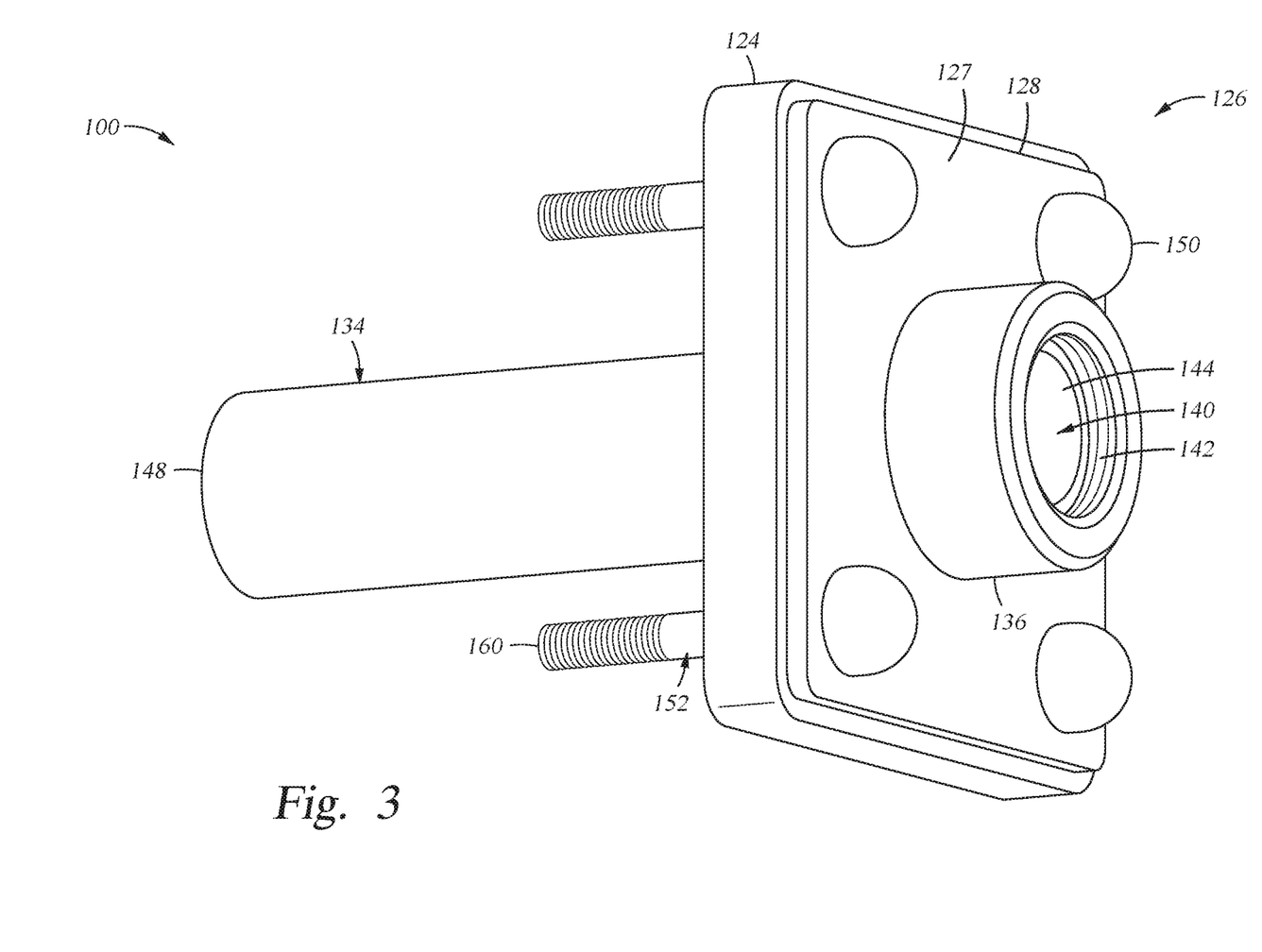
FIG. 3 is a perspective view of the tank fitting apparatus showing a bottom plate apparatus attached to an installation handle tool in a deployment position according to one embodiment.

FIG. 3 is a perspective view of the tank fitting apparatus 100 showing a bottom plate apparatus 126 attached to an installation handle tool 134. The installation handle tool 134 is used for the installation of the tank fitting apparatus 100. The installation handle tool 134 includes a handle connection end 144 and a handle tool distal end 148.

The bottom plate apparatus 126 includes a bottom plate 128 having a bottom surface 127, a bottom plate flow housing 136 extending from the bottom surface 127 of bottom plate 128, and the bottom seal member 124. A bottom plate passageway 140 extends through the bottom plate flow housing 136 and through the bottom plate 128. The bottom plate flow housing 136 is integrally formed on the bottom plate 128. The bottom plate flow housing 136 may be integrally formed on the bottom plate 128 during the manufacturing process where a single piece of metal is used to form the bottom plate 128 and the bottom plate flow housing 136. In other embodiments, the bottom plate flow housing 136 may be welded on the bottom plate 128.

The bottom plate apparatus 126 further includes a bottom plate installation connector 142 configured to connect to the installation handle tool 134 when the bottom plate apparatus 126 is in the deployment position. The bottom plate installation connector 142, as shown in FIG. 3, is in the form of an internally threaded section in the bottom plate flow housing 136. The bottom plate installation connector 142 is disposed proximate the bottom plate passageway 140. The installation handle tool 134 is connected to the bottom plate 128 by inserting a handle connection end 144 of the installation handle tool 134 through the bottom plate 128, and then attaching the handle connection end 144 into the bottom plate flow housing 136.

The bolts 152 are attached to the bottom plate 128. The bolts 152 are integrally connected with the bottom plate 128 to prevent fluid leakage. Bolt connections 150, shown in FIG. 3, connect the bolts 152 to the bottom plate 128. The bolts 152 may be welded to the bottom plate 128 to form the bolt connections 150. The bolt connectors 150 are integrally formed on the bottom surface 127 of the bottom plate 128 and extend outwardly from the bottom surface 127. Bolt connections 150 are shown on the bottom plate 128 disposed around the bottom plate flow housing 136.

Figure 4:
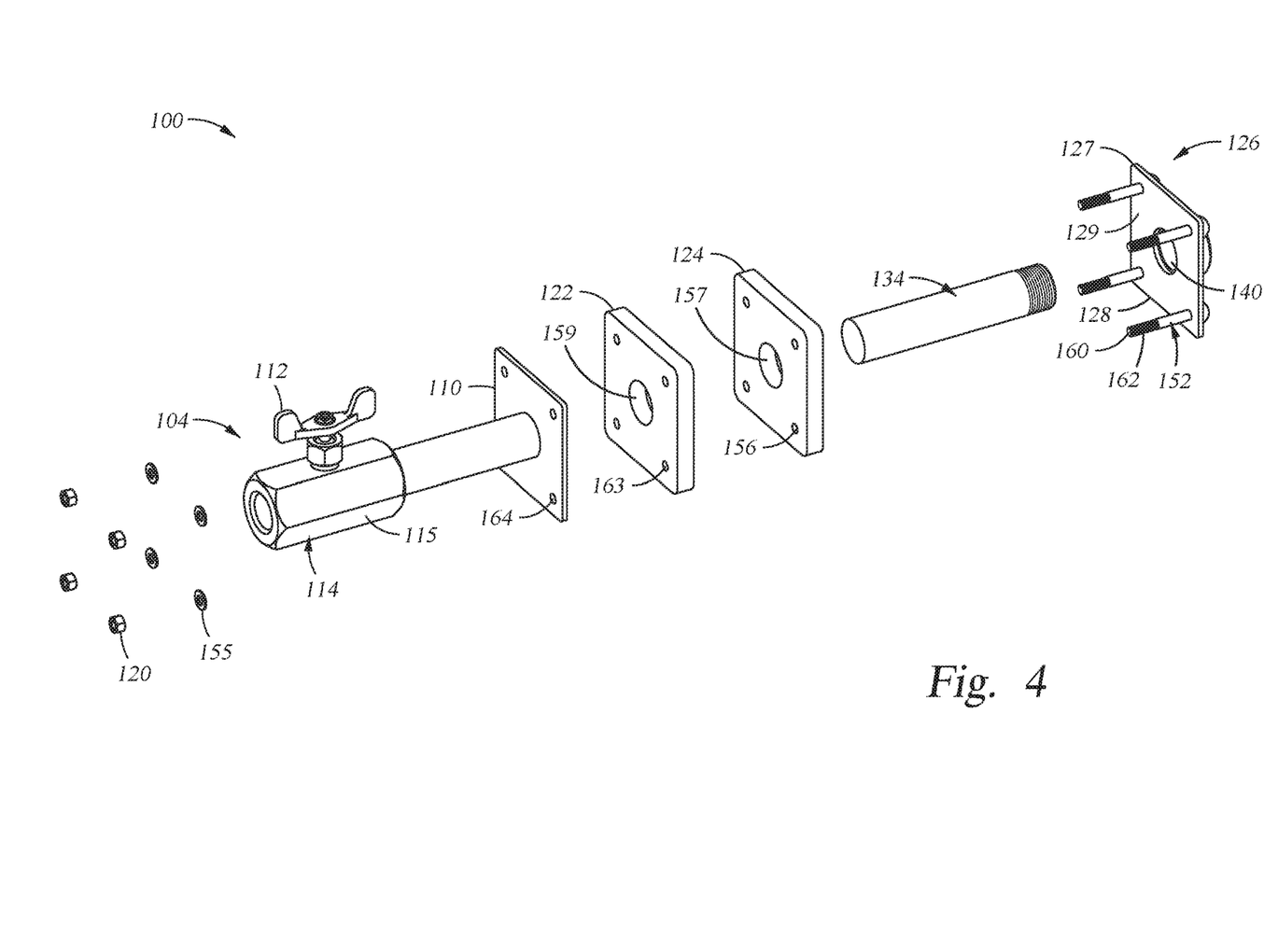
FIG. 4 is an exploded view of the tank fitting apparatus according to one embodiment.

FIG. 4 is an exploded view of the tank fitting apparatus 100. The top plate 110 of the valve apparatus 104 includes a plurality of top plate bolt passageways 164. The top seal member 122 includes a plurality of top seal bolt passageways 163 and a top seal handle passageway 159. The top seal bolt passageways 163 are sized to correspond to a bolt diameter so that the bolts 152 pass through the top seal bolt passageways 163. The top seal handle passageway 159 is sized to allow the installation handle tool 134 to pass therethrough. The top plate bolt passageways 164 and top seal bolt passageways 163 are used for connecting the valve apparatus 104 to the bottom plate apparatus 126.

The valve 114 includes the valve housing 115. The valve 114 may include valve components that are known in the prior art. For example, the valve 114 may include a valve member (not shown) formed by a movable ball valve member. In other embodiments, the valve 114 may be formed by other valve types that are movable between an open valve position and a closed valve position by using the valve handle 112.

The bottom plate apparatus 126 includes the bottom plate 128 having a top surface 129, a bottom plate passageway 140, and bolts 152 connected to the bottom plate 128 and extending from the top surface 129 of the bottom plate 128. Bolts 152 are attached to bottom plate 128 and are disposed on the bottom plate 128 between the bottom plate passageway 140 and an outer edge of the bottom plate 128. Each bolt 152 has a bolt distal end 160 and includes external threads 162 disposed proximate the bolt distal end 160. The bottom seal member 124 includes a plurality of bottom seal bolt passageways 156 and a bottom seal handle passageway 157. The bottom seal bolt passageways 156 are sized to correspond to a bolt diameter so that the bolts 152 pass through the bottom seal bolt passageways 156. The bottom seal handle passageway 157 is sized to allow the installation handle tool 134 to pass therethrough. The handle tool connection end 144 of the installation handle tool 134 has external threads 146. The external threads 146 mate with the internal threads 142 of the bottom plate flow housing 136 to attach the installation handle tool 134 with the bottom plate apparatus 126.

Figure 5:
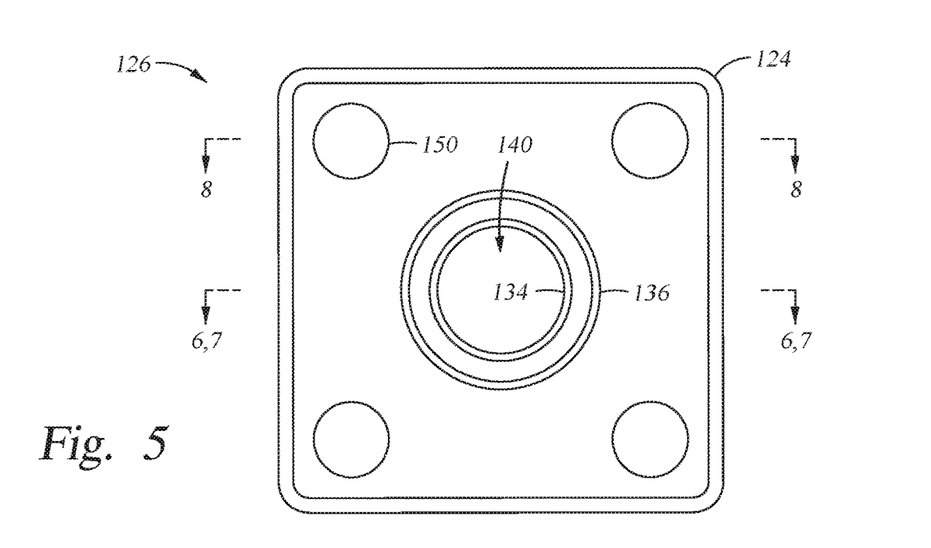
FIG. 5 is a bottom view of the bottom plate apparatus according to one embodiment.

FIG. 5 is a bottom view of the bottom plate apparatus 126 according to one embodiment. FIG. 5 shows line 6, 7 used for cross-sectional views shown in FIG. 6 and FIG. 7, and shows line 8 used for cross-sectional views shown in FIG. 8.

Figure 6:
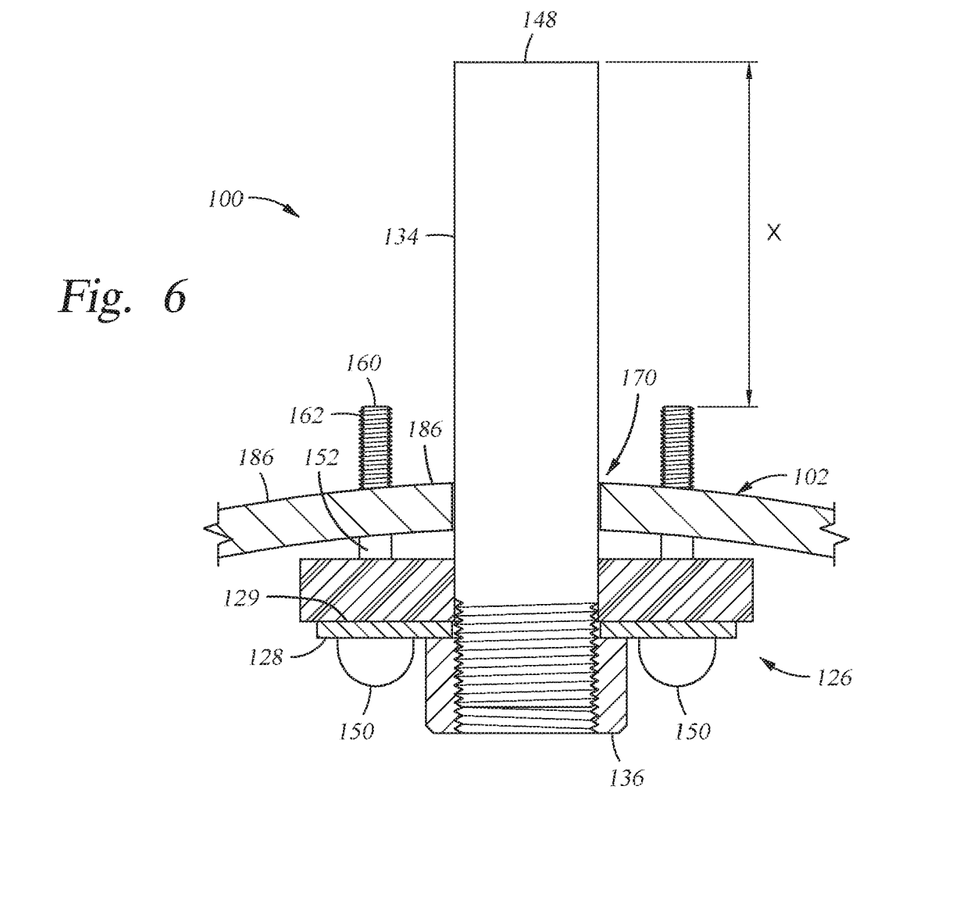
FIG. 6 is a cross-sectional view of the tank fitting apparatus taken along line 6, 7 of FIG. 5 showing the bottom plate apparatus in a deployment position with the installation handle tool and bolts extending through a tank wall of the storage tank according to one embodiment.

FIG. 6 is a cross-sectional view of the tank fitting apparatus 100 taken along line 6, 7 of FIG. 5 showing the bottom plate apparatus 126 in the deployment position with the installation handle tool 134 and the bolts 152 extending through a tank wall 186 of the storage tank 102. The handle tool distal end 148 is spaced further from the top surface 129 of the bottom plate 128 than the plurality of bolt distal ends 160. The bolt distal ends 160 are spaced from the handle tool distal end 148 by a selected installation spacing distance X that is selected to be greater than a thickness of the tank wall 186 in an area of the tank wall 186 surrounding the tank fitting opening 170.

The selected installation spacing distance X is selected so that the installation handle tool 134 can be positioned to extend from the tank interior, through the tank fitting opening 170, and to a tank exterior region before the bolts 152 are inserted through tank bolt openings 182. In some embodiments, the selected installation spacing distance X is at least one inch. In some embodiments, the tank wall 186 of storage tank 102 has a thickness that is less than one inch. The selected installation spacing distance X may be varied depending on the thickness of tank wall 186. When the bottom plate apparatus 126 is in the deployment position, the handle tool distal end 148 and the bolt distal ends 160 are separated by the selected installation spacing distance X.

Figure 7:
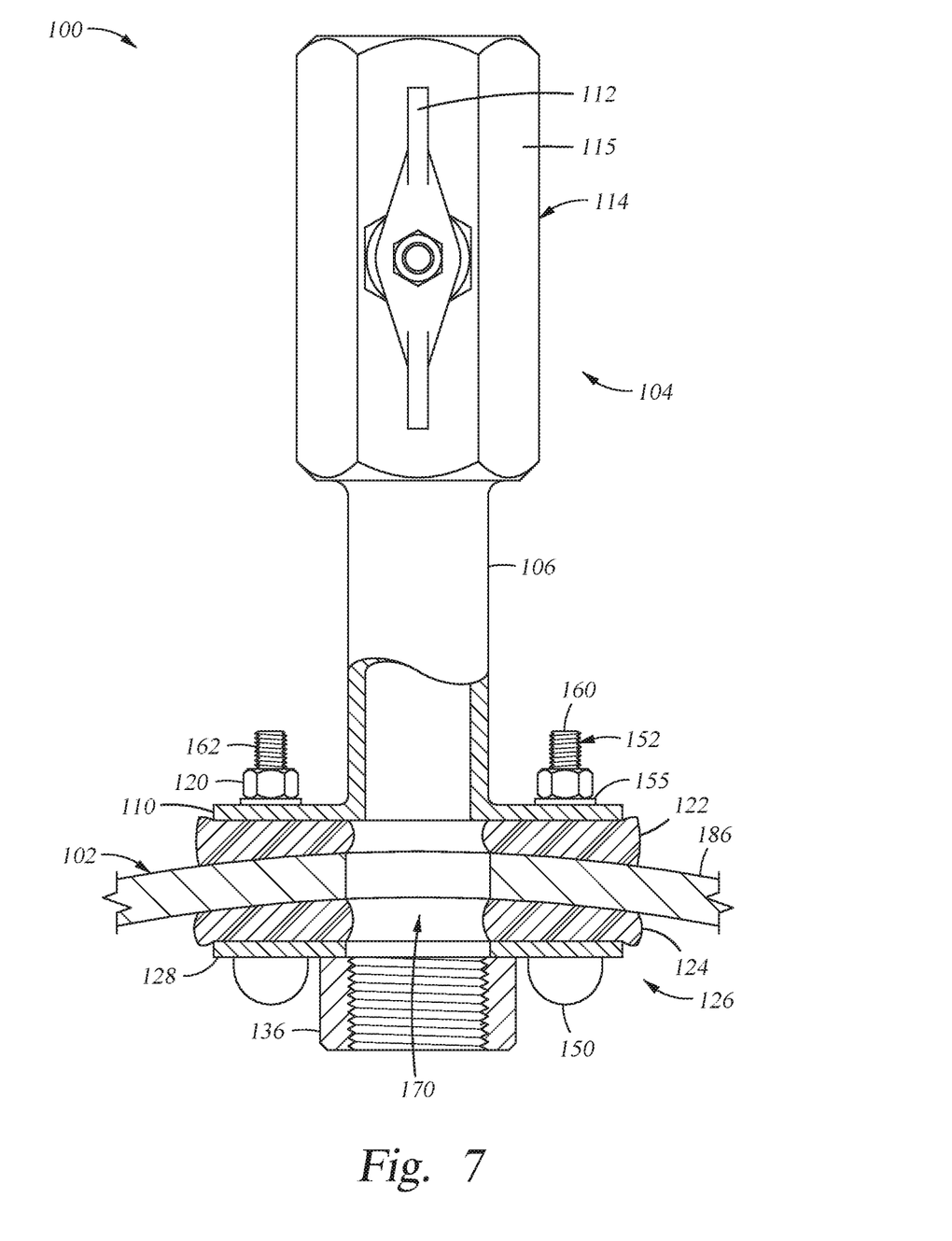
FIG. 7 is a cross-sectional view of the tank fitting apparatus taken along line 6, 7 of FIG. 5 showing the tank fitting apparatus installed on the storage tank according to one embodiment.
Figure 8:
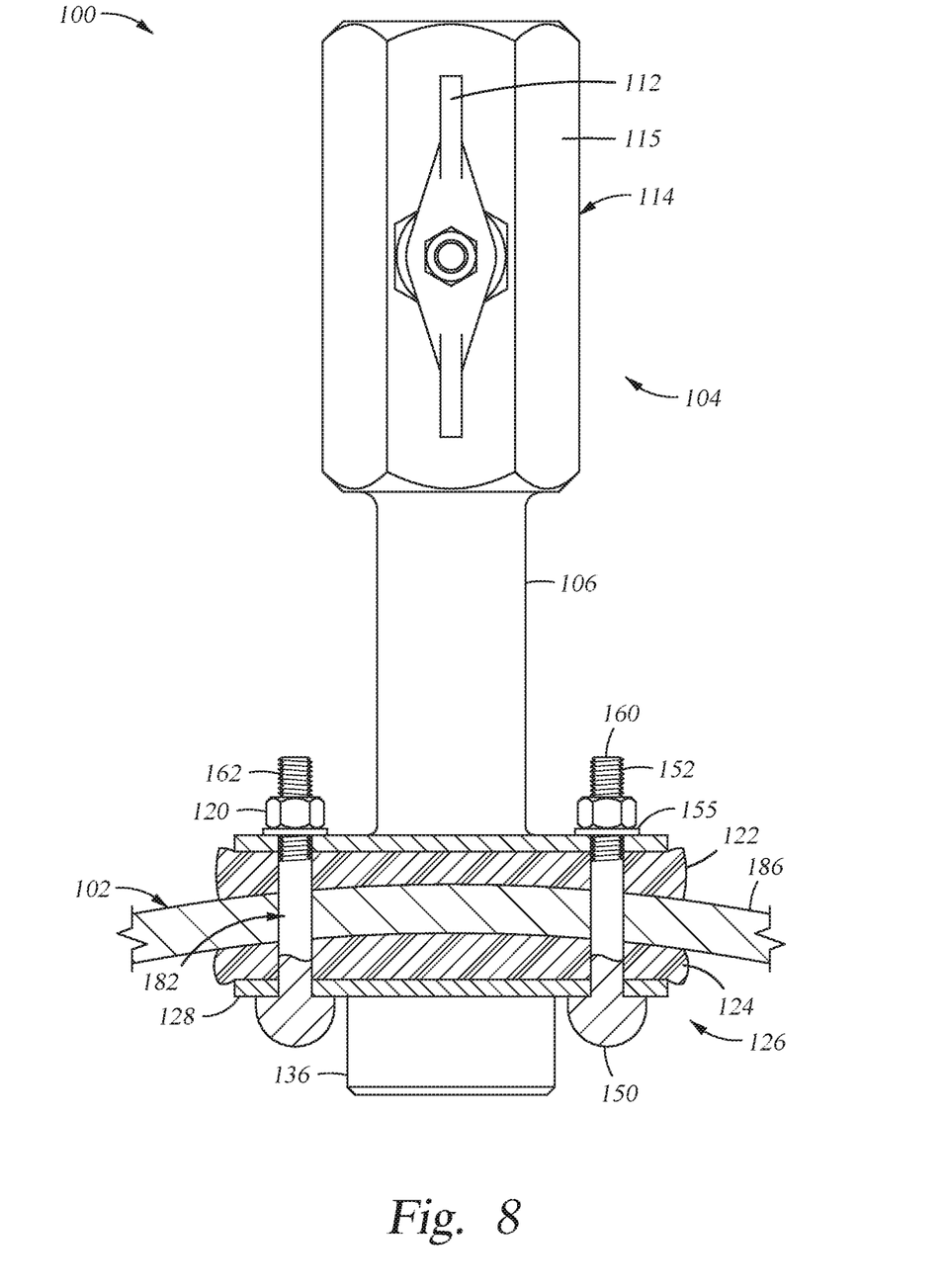
FIG. 8 is a cross-sectional view of the tank fitting apparatus taken along line 8 of FIG. 5 showing the tank fitting apparatus installed on the storage tank according to one embodiment.

Referring to FIG. 7 and FIG. 8, the tank fitting apparatus 100 is shown installed on the storage tank 102. FIG. 7 is a cross-sectional view of the tank fitting apparatus 100 taken along line 6, 7 of FIG. 5 showing the tank fitting apparatus 100 installed on the storage tank 102. FIG. 8 is a cross-sectional view of the tank fitting apparatus 100 taken along line 8 of FIG. 5 showing the tank fitting apparatus 100 installed on the storage tank 102. The installation handle tool 134 has been detached from the bottom plate apparatus 126 and is not part of the connected tank fitting position. The valve apparatus 104 is shown in an exterior region of the storage tank 102 proximate to a tank fitting opening 170 formed in a tank wall 186. On the opposite side of the tank wall 186 is the bottom plate 128, shown in an interior region of the storage tank 102 proximate to the tank fitting opening 170 in the tank wall 186. The valve apparatus 104 when in the connected tank fitting position is positionable between the closed valve position, where fluid is prevented from flowing from the storage tank 102 and through the valve apparatus 104, and the open valve position, where fluid is allowed to flow through the bottom plate flow housing 136, through the bottom plate passageway 140 of the bottom plate apparatus 126, and through the valve apparatus 104. As shown in FIG. 8, the bolts 152 secure the valve apparatus 104 to the bottom plate apparatus 126 with the bolts 152 extending through the tank bolt openings 182 in the storage tank 102.

Figure 9:
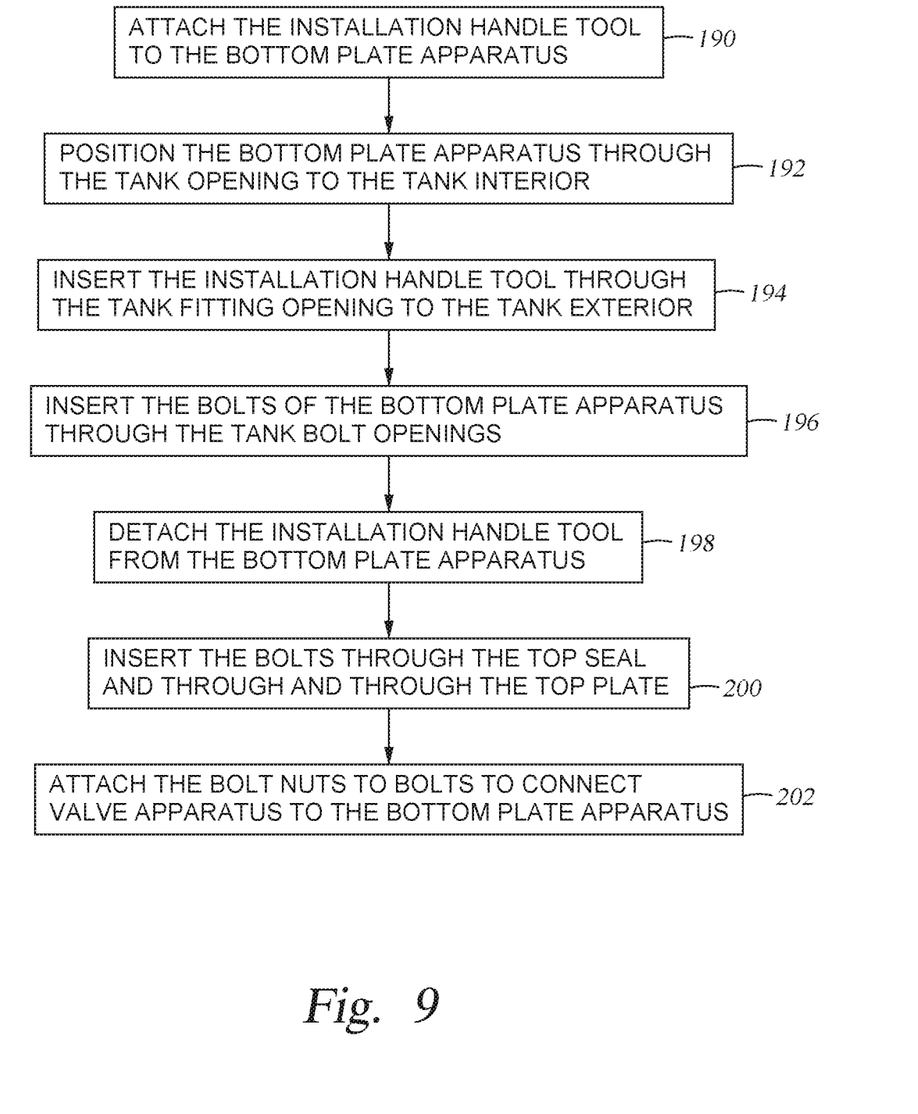
FIG. 9 is a flow chart of the method of installing the tank fitting apparatus on the storage tank according to one embodiment.

FIG. 9 shows a flowchart describing a method for installing the tank fitting apparatus 100 on the tank wall 186 of the storage tank 102. The installation method assembles the tank fitting apparatus 100 from the unconnected tank fitting position, shown in FIG. 4, to a connected tank fitting position, shown in FIG. 7 and FIG. 8. The installation handle tool 134 and the bottom plate 128 are attached (block 190)

by inserting the handle connection end 144, shown in FIG. 4, into the bottom plate passageway 140 and threading the handle connection end 144 into the bottom plate flow housing 136. The external threads 146 of the handle connection end 144 mate with the bottom plate installation connector 142 of the bottom plate flow housing 136 to attach the installation handle tool 134 to the bottom plate 128. The bottom plate apparatus 126 is in the deployment position when the installation handle tool 134 is attached to the bottom plate apparatus 126, as shown in FIG. 3 and FIG. 6.

After attaching the installation handle tool 134 onto the bottom plate apparatus 126 to position the bottom plate apparatus 126 in the deployment position, an extension tool (not shown) is attached to the bottom plate apparatus 126. The extension tool (not shown) may be needed because the installer may not be able enter the interior of the storage tank 102 to position the bottom plate apparatus 126 in the tank interior at the tank fitting opening 170. For example, the storage tank 102 may be a 20 to 30 gallon tank where the tank fitting opening 170 is out of reach of the installer without use of the extension tool (not shown). Extension tools are known in the prior art and may have an elongated extension member with a handle at one end and a gripping member at the other end. The extension tool (not shown) is used to position (block 192) the bottom plate apparatus 126 from the exterior of the storage tank 102, through a tank opening 103, and to the tank interior. The extension tool (not shown) is used to insert (block 194) the handle tool distal end 148 of the installation handle tool 134 from the tank interior, through the tank fitting opening 170, and to the tank exterior.

When the handle tool distal end 148 extends through the tank fitting opening 170 so as to extend from the tank wall 186 into the exterior region, the handle connection end 144 of the installation handle tool 134 may be gripped by an installer located at the tank exterior proximate the tank fitting opening 170, and the extension tool (not shown) is detached from the bottom plate apparatus 126. When the installer grips the portion of the portion of the handle connection end 144 extending through the tank fitting opening 170 and outwardly from the from the tank wall 186 into the exterior region, the installation handle tool 134 may be used to align the bolt distal ends 160 of bolts 152 disposed in the tank interior with the tank bolt openings 182. The installation handle tool 134 is used then to insert (block 196) the bolts 152 of the bottom plate apparatus 126 from the tank interior, through the tank bolt openings 182, and to the tank exterior, as shown in FIG. 6.

The installation handle tool 134 provides for control of the bottom plate apparatus 126 during the tank fitting installation process. The extension tool (not shown) may only provide limited positioning control of the bottom plate apparatus 126. The limited positioning control of the bottom plate apparatus 126 with the extension tool (not shown) may prevent or hinder the insertion of bolts 152 through the tank bolt openings 182 while using the extension tool so that connection of the bottom plate apparatus 126 to the valve apparatus 104 is difficult to make.

Insertion of the installation handle tool 134 through the tank fitting opening 170 with the extension tool (not shown) may be readily performed because an insertion portion of the installation handle tool 134 is configured with a diameter that is significantly smaller than the diameter of the tank fitting opening 170. For example, the diameter of the insertion portion of the installation handle tool 134 may be at least ten percent smaller than the diameter of the tank fitting opening 170. The diameter size difference between the insertion portion of the installation handle tool 134 and the tank fitting opening 170 is selected so that the extension tool (not shown) can be used to readily insert the handle tool distal end 148 through the tank fitting opening 170. Use of the installation handle tool 134 provides for precise control of the bottom plate apparatus 126 to insert the bolts 152 through the tank bolt openings 182 to overcome the positioning control limitations of the extension tool (not shown).

The installer may detach (block 198) the installation handle tool 134 from the bottom plate apparatus 126 after the bolts 152 are inserted through the tank bolt openings 182. The installation handle tool 134 is detached from the bottom plate apparatus 126 to place the bottom plate apparatus 126 in a non-deployment position, shown in FIG. 6. The installation handle tool 134 is detached by rotating the installation handle tool 134 to unthread the external threads 146 of the installation handle tool 134 from the bottom plate installation connector 142 of the bottom plate flow housing 136. After being detached, the installation handle tool 134 is pulled through the tank fitting opening 170 to the tank exterior and moved out of the way, and the bottom plate apparatus 126 is in the non-deployment position. The bolts 152 of the bottom plate apparatus 126 remain extending from the from the tank wall 186 into the exterior region and are ready to connect with the valve apparatus 104.

After detaching the installation handle tool 134, the valve apparatus 104 is moved towards the bolts 152 to insert (block 200) the bolts 152 through the top seal bolt passageways 163 of the top seal member 122 and the top plate bolt passageways 164 of the top plate 110. An installer may then attach (block 202) the washers 155 and bolt nuts 120 to the bolts 152. The top plate 110 and the bottom plate 128 are compressed towards one another by applying torque with a wrench to rotate the bolt nuts 120 on the bolts 152 so as to connect the valve apparatus 104 to the bottom plate apparatus 126. The top seal member 122 forms a seal between the top plate 110 and the storage tank 102 when the valve apparatus 104 is in the connected tank fitting position. The bottom seal member 124 forms a seal between the bottom plate 128 and the storage tank 102 when the valve apparatus 104 is in the connected tank fitting position.

The bolt nuts 120 are configured to thread onto the bolts 152 to connect the bottom plate apparatus 126 to the valve apparatus 104 in the connected tank fitting position. The design of the tank fitting apparatus 100 enables the installer to connect the valve apparatus 104 to the bottom plate apparatus 126 and install the valve apparatus 104 on the storage tank 102 with only a wrench used to tighten bolt nuts 120 on bolts 152. Other tools are not needed to perform other actions to connect the valve apparatus 104 to the storage tank 102 in the connected tank fitting position. The only other tool that may be needed for installing the valve apparatus 104 in the connected tank fitting position is the extension tool, discussed previously. The tank fitting apparatus 100 provides for easy installation.

Referring to FIG. 7 and FIG. 8, the tank fitting apparatus 100 is shown in the connected tank fitting position installed on the storage tank 102. The bottom plate 128 is positioned in proximity to the tank wall 186 in the tank interior and the top plate 110 is positioned in proximity to the tank wall 186 at the tank exterior. An exterior seal is formed between the top plate 110 and the tank wall 186 and an interior seal is formed between the bottom plate 128 and the tank wall 186. The valve apparatus 104 when in the connected tank fitting position is positionable between the closed valve position, where fluid is prevented from flowing from the storage tank 102 through the valve apparatus 104, and the open valve position, where fluid is allowed to flow through the bottom plate flow housing 136, through the bottom plate passageway 140 of the bottom plate apparatus 126, and through the valve apparatus 104.

The tank fitting apparatus 100 installed on the storage tank 102 provides a valve apparatus 104 that is operational to selectively drain fluid out of the storage tank 102. The valve apparatus 104 is configured so that the pipe 106, top plate 110, and valve housing 115 are an integral unit. The configuration of the valve apparatus 104 as an integral unit eliminates potential leak points for the valve apparatus 104. The valve apparatus 104 is configured so that the pipe 106, the top plate 110, and the valve 114 of the valve apparatus 104 are all in the exterior region of the storage tank 102 when the valve apparatus 104 is in the connected tank fitting position. The components of the valve apparatus 104 are in the exterior region both during the installation operation and when the valve apparatus 104 is in the connected tank fitting position and installed on the storage tank 102. Having no portion of the valve apparatus 104 extending into the tank interior of the storage tank 102 helps minimize leak points when the tank fitting apparatus 100 is installed in the connected tank fitting position.

While the foregoing is directed to embodiments of the present disclosure, other and further embodiments of the disclosure may be devised without departing from the basic scope thereof, and the scope thereof is determined by the claims that follow.

The invention claimed is:

1. A tank fitting apparatus for a storage tank comprising:
 a bottom plate apparatus comprising:
  a bottom plate having a top surface, a bottom surface, and a bottom plate passageway;
  a plurality of bolts connected to the bottom plate and extending from the top surface of the bottom plate; and
  a bottom plate installation connector disposed proximate the bottom plate passageway;
 an installation handle tool, wherein the installation handle tool is detachably attachable to the bottom plate apparatus by the bottom plate installation connector, and wherein the bottom plate apparatus has a deployment position where the installation handle tool is attached to the bottom plate apparatus and a non-deployment position where the installation handle tool is detached from the bottom plate apparatus; and
 a valve apparatus comprising:
  a pipe;
  a valve connected to the pipe and having a valve housing, wherein the valve housing is integrally formed with the pipe, and wherein the valve is movable between an open valve position and a closed valve position;
  a top plate integrally formed on the pipe and extending outwardly from the pipe and having a top plate bottom surface; and
  wherein the valve apparatus has a connected tank fitting position where the plurality of bolts of the bottom plate apparatus extend through the top plate of the valve apparatus to connect the valve apparatus with the bottom plate apparatus.

2. The tank fitting apparatus of claim 1, wherein the bottom plate installation connector comprises an internally threaded section configured to connect to the installation handle tool when the bottom plate apparatus is in the deployment position.

3. The tank fitting apparatus of claim 1, wherein the bottom plate has a bottom plate flow housing extending from the bottom surface of the bottom plate, wherein the bottom plate installation connector comprises an internally threaded section configured to connect to the installation handle tool, and wherein the internally threaded section is disposed in the bottom plate flow housing.

4. The tank fitting apparatus of claim 1, wherein the valve apparatus comprises a top seal member disposed adjacent to the top plate bottom surface, and wherein the bottom plate apparatus comprises a bottom seal member disposed adjacent to the top surface of the bottom plate.

5. The tank fitting apparatus of claim 4, wherein the bottom plate is positioned in proximity to a tank wall in a tank interior and the top plate is positioned in proximity to the tank wall at a tank exterior when the valve apparatus is in the connected tank fitting position, wherein an exterior seal is formed between the top plate and the tank wall and an interior seal is formed between the bottom plate and the tank wall when the valve apparatus is in the connected tank fitting position, and wherein the valve apparatus when in the connected tank fitting position is movable between the closed valve position where fluid is prevented from flowing from the storage tank through the valve apparatus, and the open valve position, where fluid is allowed to flow through the bottom plate flow housing, through the bottom plate passageway of the bottom plate apparatus, and through the valve apparatus.

6. The tank fitting apparatus of claim 1, wherein the bottom plate apparatus is in the non-deployment position when the valve apparatus is in the connected tank fitting position, and wherein the valve apparatus comprises a plurality of bolt nuts configured to thread onto the plurality of bolts to connect the bottom plate apparatus to the valve apparatus in the connected tank fitting position.

7. The tank fitting apparatus of claim 1, wherein the bottom plate apparatus comprises a bottom plate flow housing extending from the bottom surface of the bottom plate, wherein the bottom plate installation connector comprises an internally threaded section configured to connect to the installation handle tool, and wherein the internally threaded section is disposed in the bottom plate flow housing.

8. The tank fitting apparatus of claim 1, wherein the installation handle tool extends into the bottom plate passageway when the bottom plate apparatus is in the deployment position.

9. The tank fitting apparatus of claim 8, wherein the top plate has a plurality of top plate bolt passageways, wherein the installation handle tool has a handle tool distal end, wherein the plurality of bolts have a plurality of bolt distal ends, and wherein the handle tool distal end is spaced further from the top surface of the bottom plate than the plurality of bolt distal ends when the bottom plate apparatus is in the deployment position.

10. The tank fitting apparatus of claim 9, wherein the handle tool distal end and the plurality of bolt distal ends are separated by a selected installation spacing distance when the bottom plate apparatus is in the deployment position, and wherein the selected installation spacing distance is selected to be greater than a thickness of a tank wall of the storage tank in an area of the tank wall surrounding a tank fitting opening.

11. A method for installing a tank fitting apparatus on a tank wall of a storage tank, comprising:
 attaching an installation handle tool onto a bottom plate apparatus to position the bottom plate apparatus in a deployment position, wherein the bottom plate apparatus comprises a bottom plate having a top surface, a bottom surface, a bottom plate passageway, and a plurality of bolts connected to the bottom plate and extending from a top surface of the bottom plate;

positioning the bottom plate apparatus through a tank opening to a tank interior in the storage tank while the bottom plate apparatus is in the deployment position;

inserting the installation handle tool from the tank interior, through a tank fitting opening in the tank wall, and to a tank exterior while the bottom plate apparatus is in the deployment position;

inserting the plurality of bolts of the bottom plate apparatus from the tank interior, through the tank wall, and to the tank exterior so that the bottom plate is positioned adjacent to an interior surface of the tank wall and the plurality of bolts extend from an exterior surface of the tank wall while the bottom plate apparatus is in the deployment position;

detaching the installation handle tool from the bottom plate apparatus after inserting the plurality of bolts so as to position the bottom plate apparatus in a non-deployment position;

positioning a valve apparatus at the exterior of the storage tank proximate the tank fitting opening, wherein the valve apparatus comprises a pipe, a valve having a valve housing integrally connected to the pipe, a top plate integrally connected to the pipe and extending outwardly from the pipe, and wherein the valve is movable between an open valve position and a closed valve position;

inserting the plurality of bolts extending from the exterior surface of the tank wall through the top plate when the bottom plate apparatus is in the non-deployment position;

attaching a plurality of bolt nuts to the plurality of bolts to connect the bottom plate apparatus to the valve apparatus in a connected tank fitting position where the valve apparatus is installed on the storage tank.

12. The method for installing the tank fitting apparatus of claim 11, wherein the installation handle tool has a handle tool distal end and the plurality of bolts have a plurality of bolt distal ends, and wherein the handle tool distal end is spaced further from the top surface of the bottom plate than the plurality of bolt distal ends.

13. The method for installing a tank fitting apparatus of claim 11, wherein inserting the plurality of bolts of the bottom plate apparatus from the tank interior, through the tank wall, and to the tank exterior is performed after inserting the installation handle tool from the tank interior, through the tank fitting opening in the tank wall, and to the tank exterior.

14. The method for installing a tank fitting apparatus of claim 11, wherein the bottom plate has a bottom plate flow housing extending from the bottom surface of the bottom plate and a bottom plate installation connector, wherein the bottom plate flow housing has an internally threaded section configured to connect to the installation handle tool.

15. A tank fitting apparatus comprising:
a bottom plate apparatus comprising:
  a bottom plate having a bottom surface, a top surface, and a bottom plate passageway;
  a bolt connected to the bottom plate and extending from the top surface of the bottom plate;
a valve apparatus comprising:
  a pipe;
  a valve integrally formed with the pipe, and wherein the valve is movable between an open valve position and a closed valve position;
  a top plate integrally formed on the pipe and extending outwardly from the pipe;
  wherein the valve apparatus has a connected tank fitting position where the bolt of the bottom plate apparatus extends through the top plate of the valve apparatus to connect the valve apparatus with the bottom plate apparatus; and
an installation handle tool, wherein the installation handle tool is detachably attached to the bottom plate apparatus to position the bottom plate apparatus in a deployment position, and wherein the bottom plate apparatus has a non-deployment position where the installation handle tool is detached from the bottom plate apparatus.

16. The tank fitting apparatus of claim 15, wherein the bottom plate has a bottom plate installation connector disposed proximate the bottom plate passageway so that the installation handle tool is configured to extend into the bottom plate passageway when attached to the bottom plate apparatus.

17. The tank fitting apparatus of claim 16, wherein the bottom plate has a bottom plate flow housing extending from the bottom surface of the bottom plate, wherein the bottom plate installation connector is disposed in the bottom plate flow housing.

18. The tank fitting apparatus of claim 17, wherein the bottom plate installation connector comprises an internally threaded section configured to connect to the installation handle tool.

19. The tank fitting apparatus of claim 18, wherein the bottom plate is positioned in proximity to a tank wall in a tank interior and the top plate is positioned in proximity to the tank wall at a tank exterior when the valve apparatus is in the connected tank fitting position, wherein an exterior seal is formed between the top plate and the tank wall and an interior seal is formed between the bottom plate and the tank wall when the valve apparatus is in the connected tank fitting position, and wherein the valve apparatus when in the connected tank fitting position is movable between the closed valve position where fluid is prevented from flowing from the storage tank through the valve apparatus, and the open valve position, where fluid is allowed to flow through the bottom plate flow housing, through the bottom plate passageway, and through the valve apparatus.

* * * * *